April 14, 1936. C. TRAYNOR 2,037,403
TRAILER HITCH
Filed July 19, 1935 2 Sheets-Sheet 2
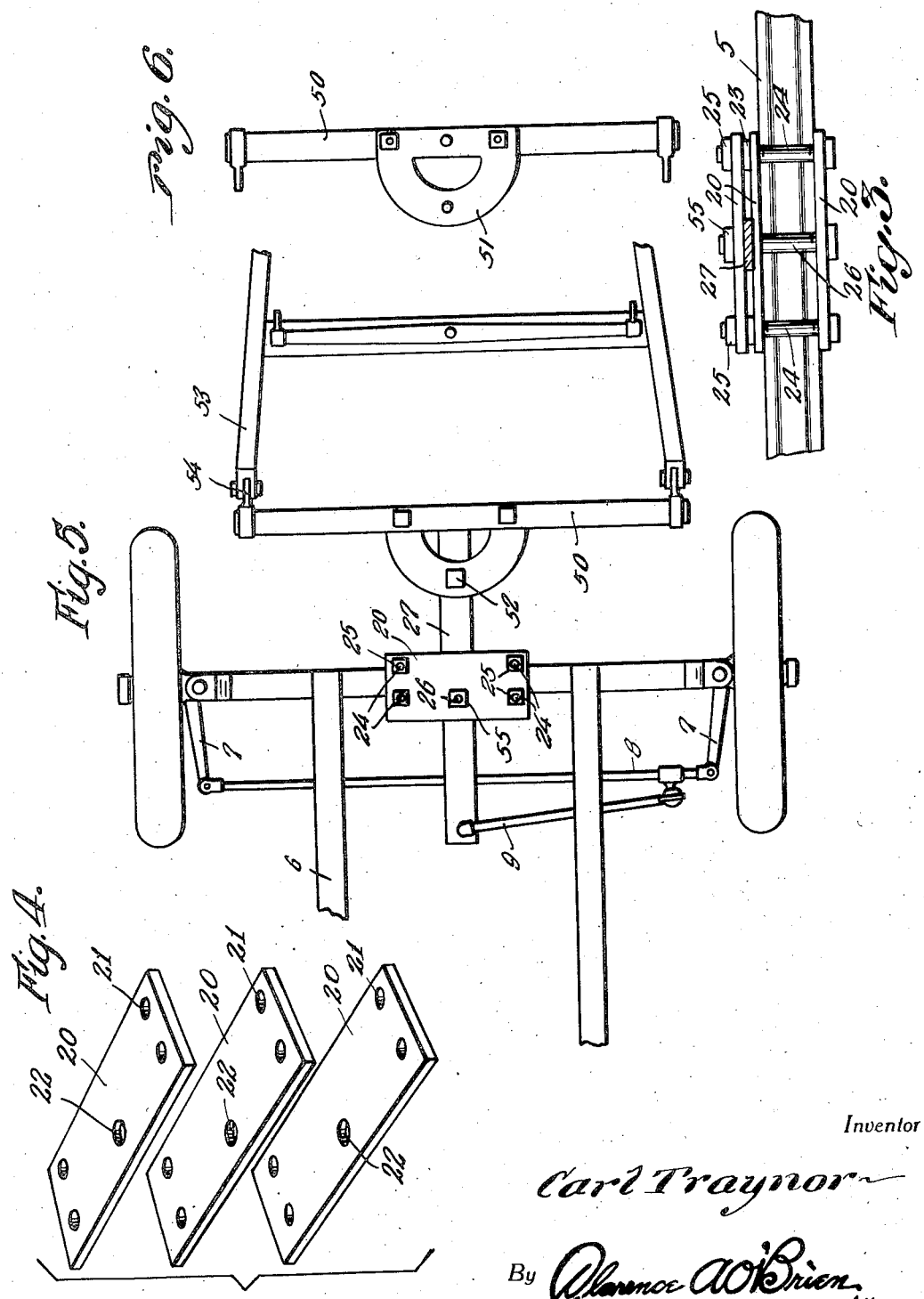
Inventor
Carl Traynor
By Clarence A. O'Brien
Attorney Patented Apr. 14, 1936

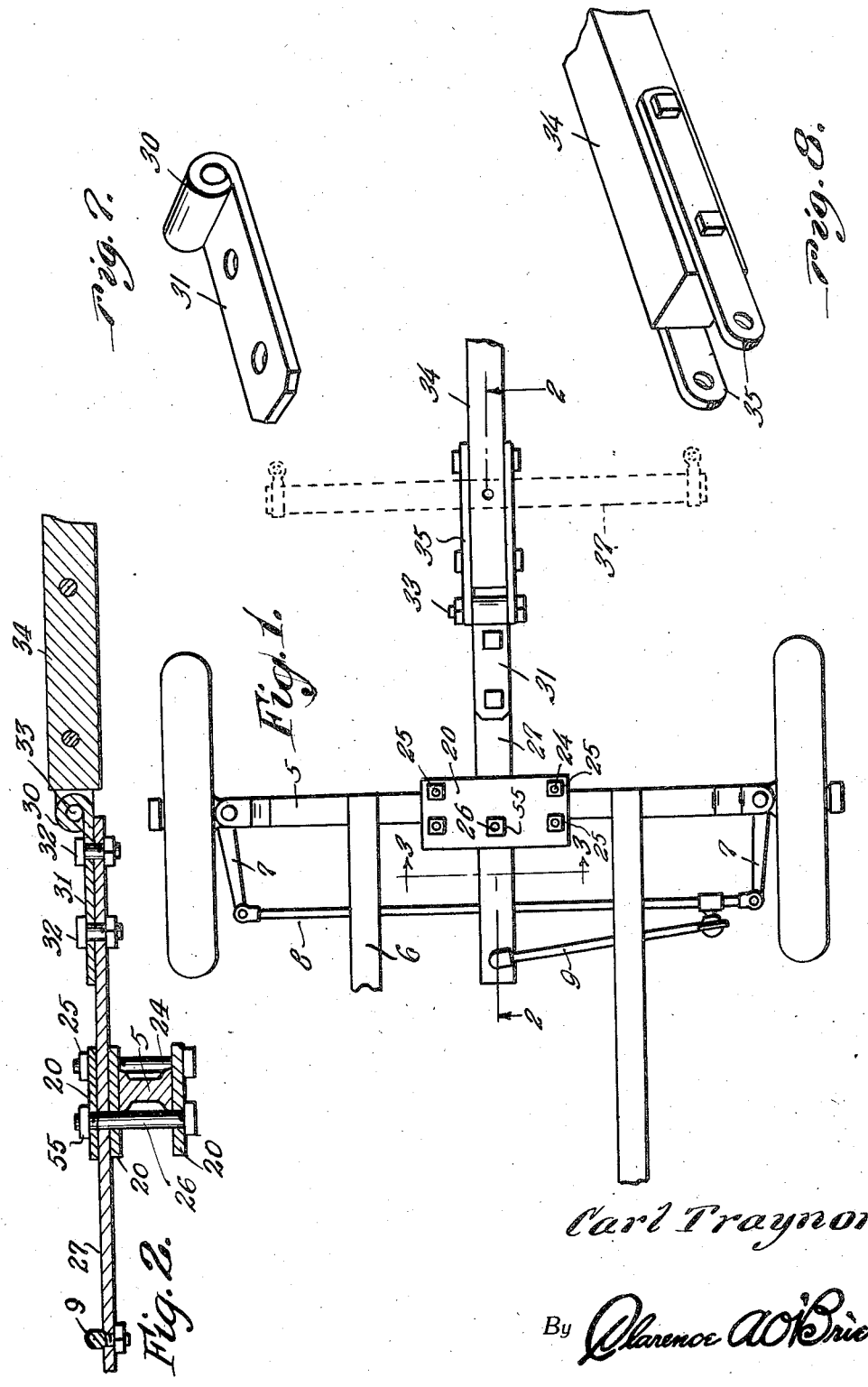

2,037,403

UNITED STATES PATENT OFFICE 2,037,403

TRAILER HITCH

Carl Traynor, Bushton, N. Y.

Application July 19, 1935, Serial No. 32,269

1 Claim. (Cl. 280—33.55)

The present invention relates to a trailer hitch and the object of the invention is to provide means whereby horse drawn means may be hitched to the chassis of an automobile or the like whereby obsolete chassis of automobiles and the like may be used for farm trailers and the like.

Another important object of the invention resides in the provision of an apparatus of this nature which is simple in its construction, inexpensive to construct, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a fragmentary top plan view of the front end of an automobile chassis showing my apparatus incorporated therein.

Figure 2 is a longitudinal vertical sectional view taken substantially on the line 2—2 of Figure 1.

Figure 3 is a sectional view taken substantially on the line 3—3 of Figure 1 looking in the direction of the arrows.

Figure 4 is a perspective view of the sleeve plate.

Figure 5 is a top plan view of another embodiment of the invention wherein a single horse or the like is to be used.

Figure 6 is a bottom plan view of the cross member thereof.

Figure 7 is a perspective view of a sleeve plate used with the first embodiment.

Figure 8 is a fragmentary perspective view showing one end of the tongue for said first embodiment.

Referring first to Figures 1, 2, 3, 4, 7 and 8 wherein I have shown an embodiment adapted to two horses or other animals, it will be noted that there are disclosed in the drawings numerous conventional parts such as the front axle 5, the frame 6, steering knuckles 7, connecting rod 8 therefor and connecting link 9 associated therewith in the usual well-known manner.

Very frequently, on a farm, and of course under different circumstances an automobile chassis becomes obsolete and it is possible to take the body therefrom and mount thereon a farm body or the like so that the same may be used to advantage with horse drawn means or the like.

In carrying out my invention, I utilize three plates 20 identical in construction and rectangular in formation and provided at the corner with openings 21 and adjacent the center of the rear edge thereof with openings 22. One plate is disposed under the axle 5, another plate above the axle 5 and a third plate also above the axle 5, spaced from the second plate by nuts 23 which retain the second mentioned plate in position immediately above the axle 5 by being adapted to be threaded on the bolts 24. These bolts 24 extend through the openings 21, and are further adapted to receive the nuts 25 which are screwed on said bolts after the top plate is in position, thereby clamping and securing the entire assembly about the front axle 5. Through the openings 22 extends a bolt 26, which retains the bar 27 in rockable relation to the uppermost plate and the innermost plate 20 above the beam or cross bar 5. This bolt 26 is put in position after the plates 20 have been clamped in position by the nuts 25 in order that the proper ease for the turning of the bar 27 may be secured through the medium of the nut 55.

A link 9 is preferably engaged with the rear end of the bar 27. A sleeve 30 has a shank 31 extending tangentially therefrom over the forward end of the bar 27 and is bolted thereto as at 32 or otherwise secured thereto. In the sleeve 30 is a bolt 33. Numeral 34 denotes a tongue having plates 35 attached thereto and extending beyond the rear end thereof to straddle the ends of the sleeve 30 and to be swingably mounted on the bolt 31. A two horse whiffletree 37 is associated with the tongues 34 so that the chassis 6 may be moved along by two horses or the like and steered to follow them.

In Figure 5 I have shown the same invention for a single horse or the like and in order to do this I have provided a cross member 50 the central portion of which is provided with an arcuate member 51 secured by bolt means or the like 52 to the forward end of the bar 27 and the ends of the cross member 50 have shafts 53 swingably engaged as at 54 with the ends of the bar 50 so that a single horse or like animal may be harnessed between the shafts or bars 53 for pulling the chassis from place to place.

It is thought that the construction, utility and advantages of this invention will now be quite apparent without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:

A trailer hitch of the class described comprising, three flat plates apertured adjacent each corner and centrally thereof, two of said plates being adapted to be disposed on the top and bottom of the front axle of the trailer, an apertured tongue disposed on the upper plate, the third plate being disposed on top of said tongue, said apertures adjacent each corner of the plate being in registry, bolts extending therethrough, said centrally disposed apertures of the plates and the aperture in the tongue being in registry, a bolt extending therethrough, said tongue being pivotal about said last named bolt between the upper plate.

CARL TRAYNOR.